(12) United States Patent
Chollampatt Muhammed Ashraf et al.

(10) Patent No.: US 12,511,500 B2
(45) Date of Patent: Dec. 30, 2025

(54) PRIORITY-BASED SCHEDULING OF TRANSLATION REQUESTS

(71) Applicant: Zoom Video Communications, Inc., San Jose, CA (US)

(72) Inventors: Shamil Chollampatt Muhammed Ashraf, Singapore (SG); Marco Turchi, Pergine Valsugana (IT); Aiko Wessels, Karlsruhe (DE); Linxiao Zeng, Singapore (SG)

(73) Assignee: Zoom Communications, Inc., San Jose, CA (US)

( * ) Notice: Subject to any disclaimer, the term of this patent is extended or adjusted under 35 U.S.C. 154(b) by 522 days.

(21) Appl. No.: 18/103,715

(22) Filed: Jan. 31, 2023

(65) Prior Publication Data

US 2024/0256797 A1    Aug. 1, 2024

(51) Int. Cl.
    *G06F 40/58*      (2020.01)
    *H04L 12/18*      (2006.01)

(52) U.S. Cl.
    CPC .......... *G06F 40/58* (2020.01); *H04L 12/1822* (2013.01)

(58) Field of Classification Search
None
See application file for complete search history.

(56) References Cited

U.S. PATENT DOCUMENTS

2010/0283829 A1* 11/2010 De Beer ................ H04M 3/56
                                                            348/14.09

FOREIGN PATENT DOCUMENTS

WO    WO-2023049417 A1 * 3/2023 ............ H04N 7/147

OTHER PUBLICATIONS

Currently Pending U.S. Appl. No. 17/895,773; filed Aug. 25, 2022.
Currently Pending U.S. Appl. No. 17/733,956; filed Apr. 29, 2022.

* cited by examiner

*Primary Examiner* — Omar S Parra
(74) *Attorney, Agent, or Firm* — Kilpatrick Townsend & Stockton LLP

(57) ABSTRACT

An example method for priority-based scheduling of translation requests includes establishing first and second video meetings among a plurality of client devices. A computing device may receive, from first and second client devices, first and second translation requests associated with the first and second video meetings, respectively, wherein the translation requests identify first and second textual information, respectively. The computing device may enqueue the first textual information in a first queue, the first queue having a first weight and enqueue the second textual information in a second queue, the second queue having a second weight. The computing device may dequeue a first portion of the queued first textual information from the first queue and dequeue a second portion of the queued second textual information from the second queue. The computing device may insert the first and second portions into a translation buffer associated with a translation service.

20 Claims, 9 Drawing Sheets

PRIORITY-BASED SCHEDULING OF TRANSLATION REQUESTS

FIELD

The present application generally relates to video conferences and chat channels, and more particularly relates to scheduling of translation requests for video conferences and chat channels.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
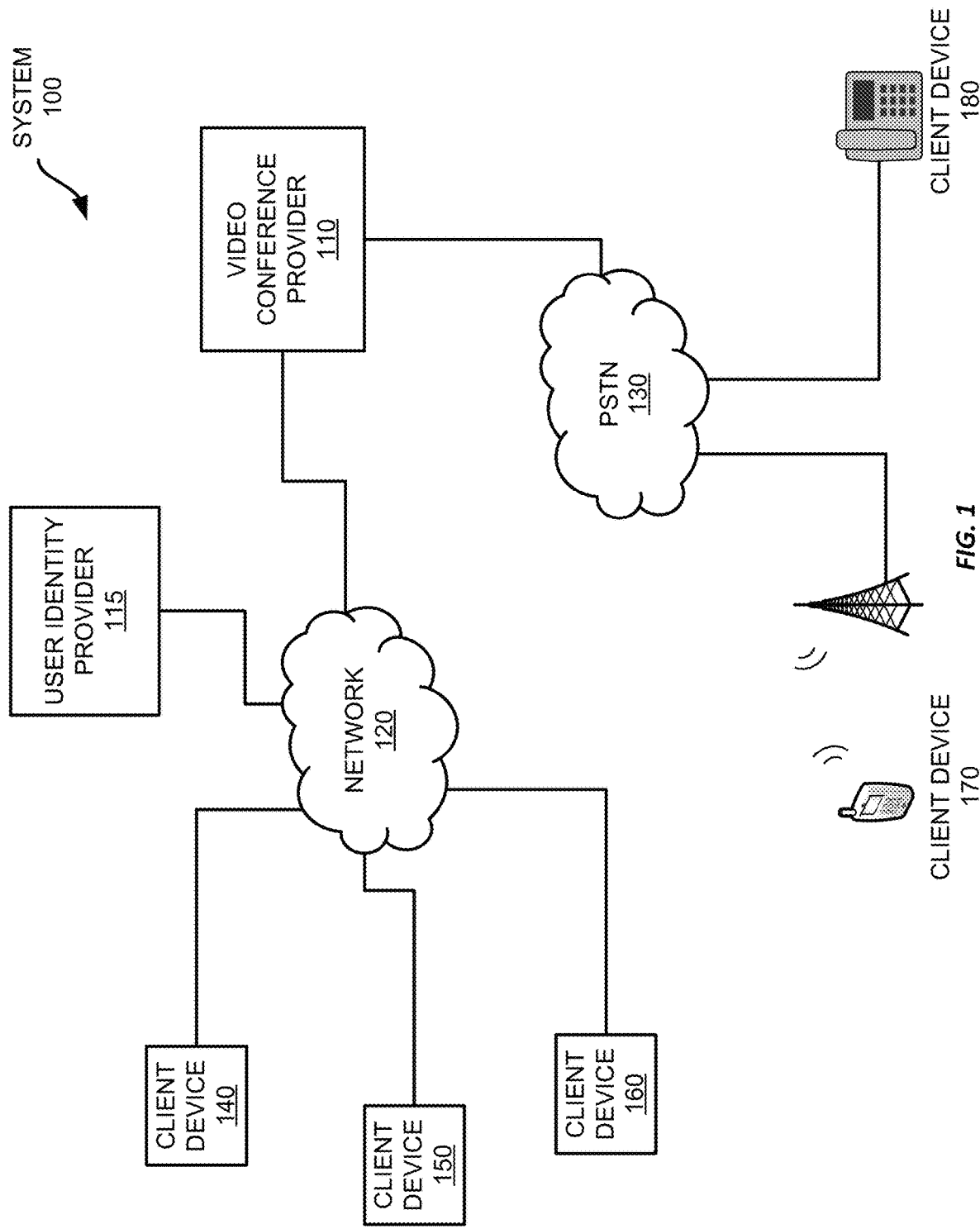
FIG. 1 shows an example system that provides video conferencing functionality to various client devices.

Examples are described herein in the context of systems and methods for priority-based scheduling of translation requests. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing has become a fixture of modern communication. The proliferation of video conferencing technology has made it easier to connect with users across borders, but simultaneously highlights the difficulty of communicating when the participants lack a common spoken language. Machine translation technologies can enable users of video conferencing technology to receive translations for in-progress video meetings (hereinafter "in-progress meetings") in real-time. Machine translation technologies can also enable users of video conferencing technology to receive translations for concluded video meetings (hereinafter "concluded meetings"). For example, machine translation technologies may translate a recording or transcript of a concluded meeting. Both in-progress and concluded meetings may be transcribed and translated.

In some examples, a translation service may receive translation requests from video conferencing participants. However, the particular needs of translation requestors may vary. For example, in-progress meetings may require low latency. Latency refers to how long a particular translation request takes to complete. During in-progress meetings, where near-real-time translations are desired by the participants, translation requests may be sent to the translation service as soon as they are ready to be translated. For example, audio may be transcribed as the meeting progresses and sent to the translation service incrementally. The translation service may be configured to minimize latency under those circumstances.

In contrast, concluded meetings may be transcribed and sent to the translation service as one or more batches of translation requests. In such cases, the translation service may be configured to maximize throughput. Throughput refers to the number of simultaneous requests from concluded meetings that may be processed in a given period of time. The translation service may be configured to maximize throughput by ensuring that batches of translation requests are fairly scheduled and that no concluded meeting request is unduly delayed by the processing of other requests.

A common problem for the above-described separate requirements for processing in-progress versus concluded meeting translation requests is that maintaining separate instances of the translation service for in-progress and concluded meeting translations, respectively, can be costly and inefficient. For example, in some circumstances translation services dedicated to in-progress meeting translations may be overutilized while translation services dedicated to concluded meeting services sit idle. The utilization of particular translation services may vary according to time and day. Starting, stopping, and reallocating cloud-based translation services can be resource-intensive and require frequent manual administrator intervention. Therefore, an approach is needed that meets the latency requirements of translating in-progress meetings in near-real-time, the throughput requirements of translating concluded meetings, as well as the operational requirements of other related services, which optimizes the use of all available translation services. In other words, an approach is needed that can meet the needs of certain translation use cases without degrading the performance of other use cases.

Example systems and methods for priority-based scheduling of translation requests are provided herein. In general, translation requests are submitted to the translation service as portions of audio transcripts. Submissions to the translation service may be as small as individual sentence fragments or may be batches including the text from the complete transcript of a concluded meeting. For example, in-progress meetings may submit translation requests continuously as sentence fragments, sentences, or batches of sentences. In contrast, the transcript for a concluded meeting may be submitted to the translation service in whole or in part as one or more batches of translation requests. A batch may include a plurality of sentences or sentence fragments. The client device can reduce transcripts into data sizes suitable for enqueuing for translation. For example, transcripts may be reduced to data structures including individual sentences or sentence fragments.

In an example, translation requests may be scheduled using at least two queues. A first queue may be used for in-progress meetings. The first queue may operate according to a "First-In-First-Out" ("FIFO") scheme in which translation requests are scheduled in the order they arrive at the translation service. A FIFO approach may produce a low enough latency to provide near-real-time translations for in-progress meetings. The natural time distribution of human speech and normal variation in request rate between different meetings result in translation requests that can be timely processed as-received without any additional scheduling procedures, while still achieving the desired latency.

A second queue may be used for concluded meeting requests. In the case of concluded meetings, all requests from one concluded meeting may be submitted to the translation service as one or more batches. For example, the recording of a concluded meeting may be transcribed by the video conference provider. The transcript may be converted by a client device into one or more individual translation requests, which may be submitted to the translation service as one or more batches. Enqueuing these batches using a FIFO scheme might result in a batch or batches of translation requests from a single concluded meeting that could block the translation of other requests from other meetings. In this scenario, only minimal throughput would be achieved, corresponding to a single concluded meeting.

To solve this problem, the second queue may be composed of multiple FIFO subqueues. Each FIFO subqueue may correspond to a distinct concluded meeting. As will be described in greater detail below, when a concluded meeting translation request arrives, the request may be enqueued in a first FIFO subqueue included in the second queue. When a concluded meeting translation request for a second concluded meeting arrives at the translation service, the second request may be enqueued in a second FIFO subqueue included in the second queue. The requests from the second queue may be fetched from each subqueue using a round-robin approach. Continuing with this example, a request from the first concluded meeting translation request batch may be dequeued from the first FIFO subqueue, followed by a request from the second concluded meeting translation batch from the second FIFO subqueue, before then returning to the first FIFO subqueue, and so on, in a round-robin manner. The round-robin process may be coordinated by way of an associated ring buffer to keep track of the order of concluded meetings. In addition, the second queue may have an associated index corresponding to the subqueue of the concluded meeting for which to dequeue the next request from.

Machine translation may proceed in rounds, wherein the translation service dequeues requests from the first and second queues described above to a translation buffer. The translation service may then read from the buffer at fixed time intervals. Requests from the first and second queues may be dequeued according to a designated priority of each queue. In other words, the translation buffer may be populated in proportion to weights assigned to each queue. For example, the in-progress meeting first queue may be assigned a weight of 3, while the concluded meeting second queue may be assigned a weight of 1. For each round of translation, the translation service may try to select 1 concluded meeting request for every 3 in-progress meeting requests. For example, for a translation buffer size of 8, this would result in 2 concluded meeting requests and 6 in-progress meeting requests per round of translation. When a request is dequeued from the second queue, the request may be taken from the FIFO subqueue corresponding to the current index value, which is then incremented to the next subqueue on the ring buffer.

In some examples, in a given translation round, one of the queues may contain fewer requests than its proportional share of the translation buffer. For instance, in the example, above, the concluded meeting second queue may contain only 1 element in a round, where its proportional share of the translation buffer is 2 requests. In that event, empty slots in the translation buffer may be filled from the first non-empty queue with the highest priority. In this example, requests may be drawn from the in-progress meeting first queue. In some examples with more than two queues, if the first non-empty queue with the highest priority is exhausted, requests may be drawn from lower priority queues, in descending order of priority. This procedure ensures that the translation buffer is always filled with the maximum number of available requests and that fewer computational resources are wasted.

Other configurations and numbers of queues are possible. For example, the concluded meeting second queue may include translation requests from a chat channel. Alternatively, translation requests may be scheduled using three or more queues. The first and second queues may correspond to video conferences as described, while a third queue may correspond to translation requests from a chat channel. Additional queues may be used for translations originating from different applications. Various other types of queue implementations may be employed, in addition to the types discussed in the preceding paragraphs.

In some examples, one or more queues may be an indexed queue. An indexed queue may include a hash map, which may itself include numerical indexes as keys and translation requests as values. The numerical indexes may be enqueued, rather than the values, so that the translation request can continue to be updated while awaiting translation in the queue. For example, a translation request for an in-progress meeting may contain a transcribed sentence fragment which may be updated to include a complete sentence. Initially, the sentence fragment may be enqueued in the indexed queue, via a numerical index. Later, the fragment may be updated to be a complete sentence by updating the value of the hash map without affecting the enqueued index.

This illustrative example is given to introduce the reader to the general subject matter discussed herein and the disclosure is not limited to this example. The following sections describe various additional non-limiting examples and examples of systems and methods for priority-based scheduling of translation requests.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
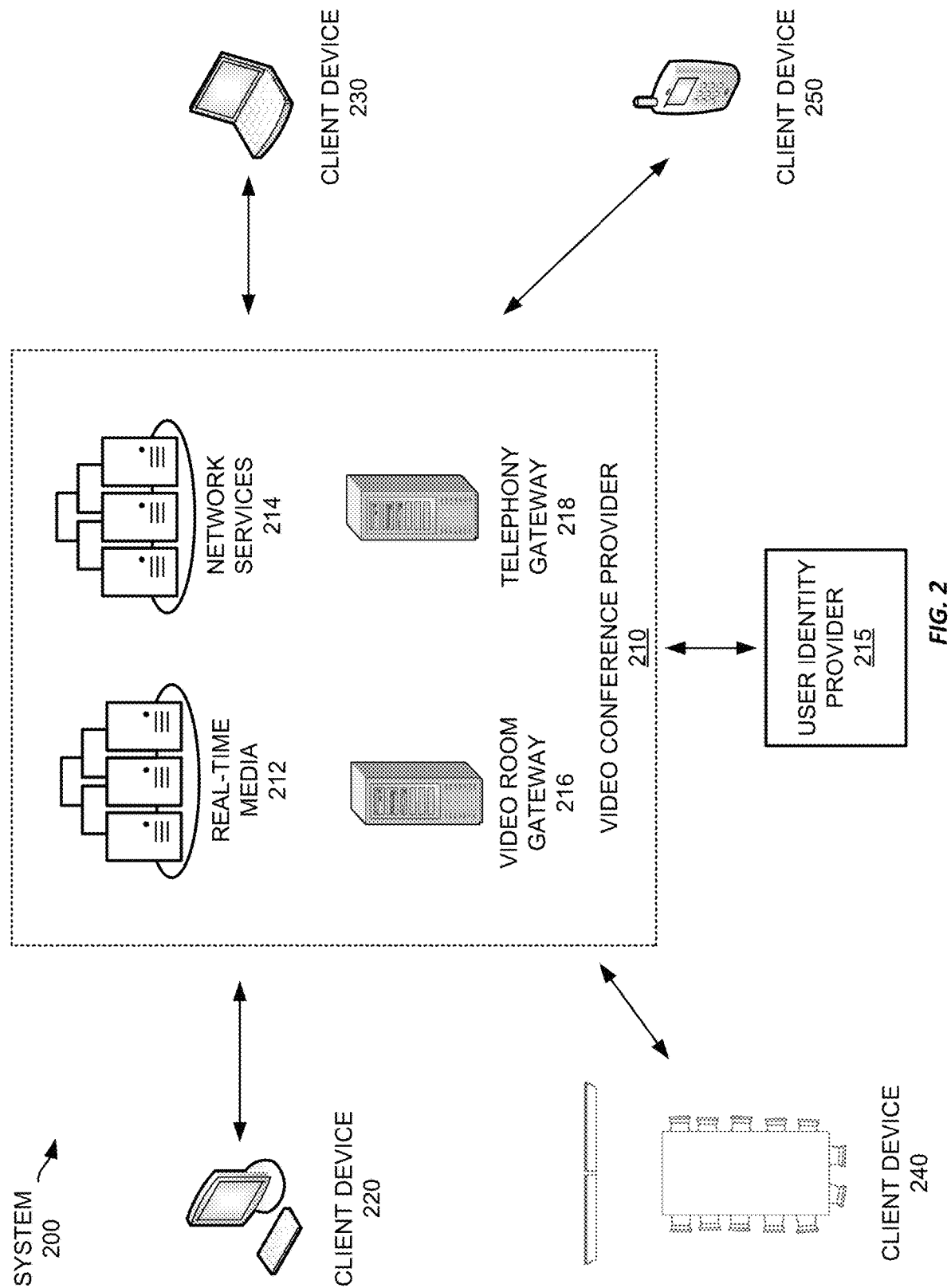
FIG. 2 shows an example system in which a video conference provider provides video conferencing functionality to various client devices.

Video conference provider 110 allows clients to create video conference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 110 which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers that have processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any device that can be make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a healthcare provider may establish identities for its patients. However, while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video meeting, e.g., a meeting identifier, a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides video conferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers 212 to record a portion of the meeting for review by the chat and video conference provider 210. Still, other functionality may be implemented to take actions based on the decrypted multimedia streams at the chat and video conference provider, such as real-time translation of in-progress video meetings, translation of recorded or transcribed concluded video meetings, monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection to the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determine to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of one or more participants for joining the meeting.

In addition to creating and administering on-going meetings, the network services server(s) 214 may also be responsible for closing and tearing-down meetings once they have been finished. For example, the meeting host may issue a command to end an on-going meeting, which is sent to a network services server 214. The network services server 214 may then remove any remaining participants from the meeting, communicate with one or more real-time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider 210 to one or more of its subscribers, which may provide access credentials to the video conferencing hardware for connecting to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider 210 when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
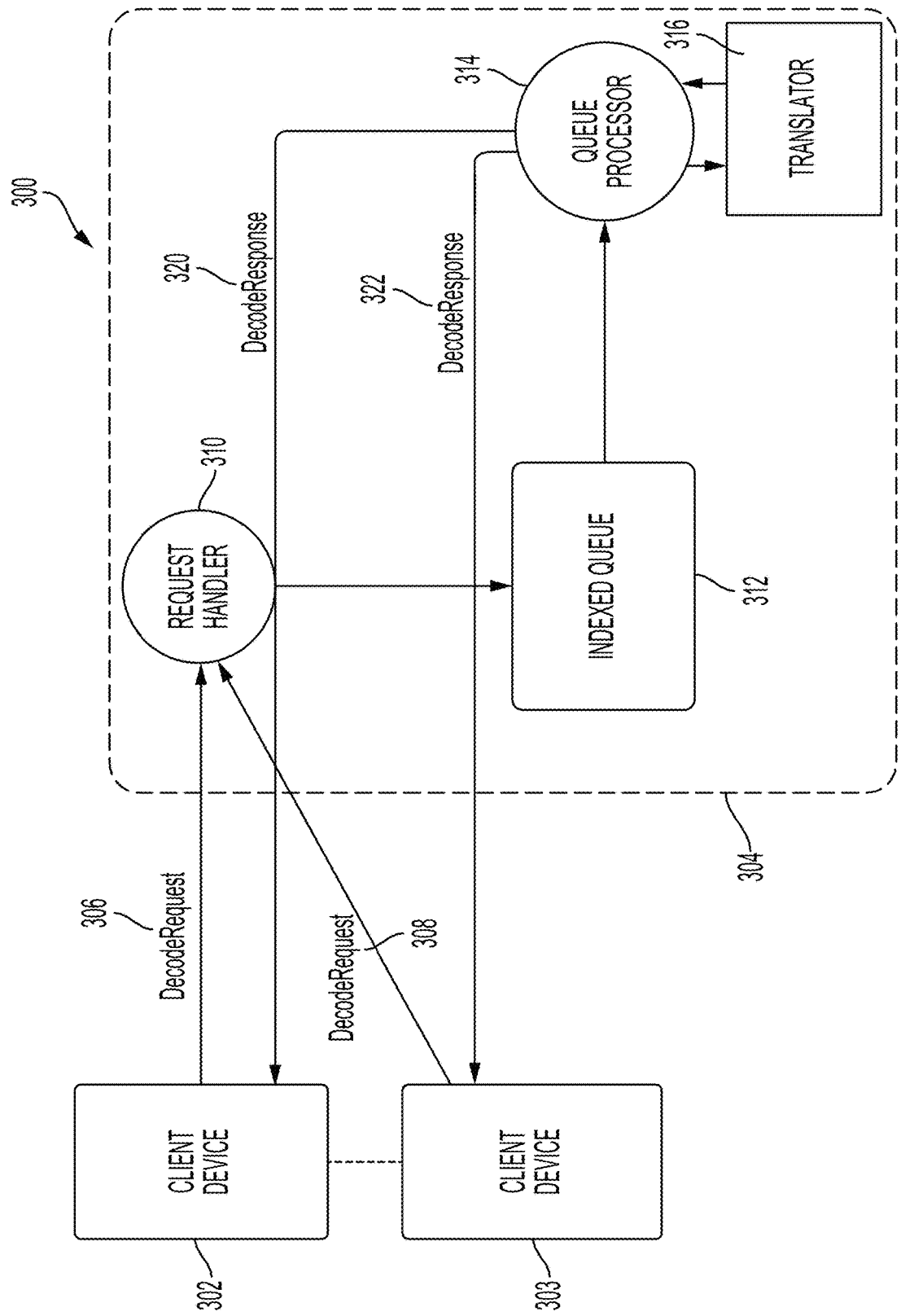
FIG. 3 shows an example of a system for priority-based scheduling of translation requests according to this disclosure.

Referring now to FIG. 3, FIG. 3 shows an example of a system 300 for priority-based scheduling of translation requests according to this disclosure. System 300 includes one or more client devices 302, 303. The client devices 302, 303 may enable one or more users to participate in a video meeting hosted by the chat and video conference provider 110. Users of client devices 302, 303 that are participants in video meetings may require translations of video meetings in the case where participants speak different languages or for any other reason. For example, in order for speakers of different languages to communicate during an in-progress meeting, participants may desire real-time translations of audio streams exchanged between participants. In another example, participants may wish to review the content of a concluded meeting. A concluded meeting can be reviewed alongside a transcript of the concluded meeting. Reviewers may desire translations of the transcripts of concluded meetings if they are in a different language or for any other reason. In yet another example, participants in a chat channel may desire near-real-time translations of chat messages received from other participants using different languages.

System 300 includes a translation service 304 used for translation of in-progress and concluded meetings, as well as instances of other services including, for example, chat channels. The translation service 304 may be a part of the video conference provider 110 or it may be a standalone service. Multiple instances of the translation service 304 may be executing simultaneously, for example, in separate containers or virtual machines. The systems and methods of the present disclosure correspond generally to a single instance of the translation service 304, but the methods could be shared or implemented across multiple instances. For example, in some implementations, requests may be drawn from queues shared by different translation service instances. In that example, queues may reside in a shared memory including, for example, a cache or database.

In some examples, a client device 302 may be used for an in-progress meeting in which one or more participants desire a near-real-time translation of the audio stream(s) exchanged between the meeting participants. Or the client device 302 may have been used for a concluded meeting for which a participant desires a translation. The client device 302 sends a translation request 306 to the translation service 304. In some embodiments, the video conference provider 110 may send the translation request 306 to the translation service 304. In other embodiments, the client device 302 sends the translation request 306 to another intermediate service, controller service, or gateway. The intermediate service, controller service, or gateway can route translation requests to the translation service. The translation request 306 may be an in-progress meeting translation request or a concluded meeting translation request. An in-progress meeting translation request is a translation request for an in-progress meeting and a concluded meeting translation request is a translation request for a concluded meeting. An in-progress meeting translation request may contain sentences, a sentence, or a sentence fragment derived from a transcription of an in-progress meeting. For example, automatic speech recognition ("ASR") may be used by the client device 302 or the video conference provider 110 to produce a transcript of the in-progress meeting audio in real-time. A concluded meeting translation request may contain the transcript or a portion of a transcript from a concluded meeting. The transcript or portion thereof may be divided into a plurality of sentences or sentence fragments and sent to the translation service 304 as one or more batches of requests. The size of the batches may vary according to the configuration of the translation service 304. For example, the translation service 304 may include a configuration parameter that specifies the maximum batch size that client devices 302, 303 may send to the translation service 304. The configuration parameter may be selected based on achieving the throughput desired for concluded meeting translations. In some examples, the batch size may correspond to the capacity of the translator 316. In some other examples, the client devices 302, 303 may send batches of any size to the translation service 304. A component of the translation service 304 may then process incoming batches and further divide them into sub-batches that correspond to the capacity of the translator 316 or some other configuration parameter.

The translation request 306 may include a message, a method call, a remote procedure call, remote method invocation, an application programming interface ("API") request, or any other suitable mechanism for communicating the translation request 306 to the translation service 304. For example, the translation request 306 may include an API call to an API endpoint labeled "DecodeRequest" that may cause the translation service 304 to perform certain operations. In some examples, "DecodeRequest" is a label associated with the translation request 306 payload. For example, the translation request 306 may include a data structure including, for example, JSON data. The JSON data may have one or more fields. A field containing the translation request 306 payload may be labeled "DecodeRequest." A plurality of translation requests 306, and 308 may be sent from a plurality of client devices 302, 303 to the translation service 304.

The translation request 306 may include textual information. The textual information can be derived from a transcription of the audio from an in-progress or concluded meeting. The textual information may be a data structure that contains data intended for translation. In one example implementation, the textual information may contain one or more text data structures. The text data structures may be labeled as "TextData." The text data structures may each contain one or more sentence data structures. The sentence data structures may be labeled "SentenceData." A sentence data structure may contain the text string intended for translation. The text string may not necessarily be a complete sentence. For example, the text string may include a fragment of a sentence, while in other examples, the text string includes a complete sentence. Depending on the completeness or "state" of the text string, the sentence data structure may include state information. The state information may correspond to the extent to which a complete sentence data structure is included in the translation request 306. For instance, a sentence data structure may include the state information label "UNSTABLE." An example of a sentence data structure with state information "UNSTABLE" may be a sentence being transcribed by an ASR system that has yet to be completed, resulting in a sentence fragment being included in a translation request. Similarly, if the sentence data structure is for a full sentence, then the state information may indicate the status as "STABLE."

The translation request 306 may includes an indication of the source language of the data contained in the text data and sentence data structures. The translation request 306 may also includes an indication of the target language of the requested translation. For example, the translation request 306 may includes data labeled "src_lang" which can indicate the source language (e.g., English, Spanish, German, etc.). The source language may be indicated according to a suitable mapping scheme including a string literal or a lookup table. Continuing with the example, the translation request 306 may includes data labeled "dest_lang" indicating the target language of the requested translation (e.g., Mandarin, Japanese, Yiddish, etc.). The target or destination language may be similarly indicated according to a suitable mapping scheme including a string literal or a lookup table. The translation request 306 may also contains an indication of whether it is an in-progress meeting translation request or a concluded meeting translation request, along with an identifier that uniquely identifies the source meeting.

Some embodiments of the translation service 304 include a request handler 310. Upon receiving the translation request 306 by the translation service 304, the translation request 306 may be passed to the request handler 310. The request handler 310 may validate the translation request. For example, the request handler 310 may validate the translation request based on one or more factors. Some example factors include checking for proper formatting of the text data or sentence data structures, verifying that the language contained in the sentence data structures corresponds to the specified source language, and checking for invalid characters in the sentence data structures, among other possible factors. A failed validation at the request handler 310 may result in a translation response 320 being returned to the client device 302. The returned translation response 320 may include respective error codes and/or messages as to why the validation failed. Upon successful validation by the request handler 310, the translation request 306 may be enqueued to an indexed queue 312.

The translation request 306 is enqueued or "pushed" to an indexed queue 312. Pushing or enqueueing to a queue refers generally to a mechanism for adding a new element (e.g., a translation request) to a queue. In contrast, "popping" or dequeuing from a queue refers generally to a mechanism for removing an element from a queue. The conditions under which an element may be pushed to a queue, the response of the queue to the new element, how the new element is stored in the queue, how and when an element may be popped, etc. may vary according to the implementation of the particular type of queue. The indexed queue 312 may include multiple subqueues corresponding to different types of translation requests. For example, the subqueues of the indexed queue 312 may have different queue implementations corresponding to whether the translation request is an in-progress meeting translation request, a concluded meeting translation request, a chat translation request, or other type of request. For example, one subqueue of the indexed queue 312 may be a "First-In-First-Out" ("FIFO") queue for in-progress meeting translation requests. Another subqueue of the indexed queue 312 may itself include multiple subqueues for a concluded meeting translation request or chat translation request. Other queue implementations are possible for these or other types of translation requests. The subqueues of the indexed queue 312 may be assigned a priority. The priority may determine the proportion of elements that are dequeued from a particular subqueue. The priority will be discussed in detail in the description of FIGS. 4 and 7 below.

The indexed queue 312 may include a hash map. A hash map is a data structure that maps one or more keys to one or more values. A hash map may have a variety of implementations. For example, mapping of keys to values may be a 1-to-1 mapping or it may be a many-to-many mapping. When the translation request 306 is pushed to the indexed queue 312, the indexed queue 312 may add the one or more sentence data structures contained in a translation request to the hash map as values using a specified scheme for creating unique keys. In one implementation, each sentence data structure may be a value in the hash map. The corresponding keys may be strings that identify the text data structure in which the sentence data structure is contained along with an identifier of the client device 302 that originated the translation request 306.

The indexed queue 312 may enqueue the hash map key in the corresponding queue implementation, rather than the value. The key may be enqueued, rather than the value, so that the sentence data structure can continue to be updated while the translation request 306 is awaiting translation. Therefore, in some implementations, the key may only be pushed to the corresponding queue implementation if it is not already in the queue. In some examples, the sentence data structure may include state information. The state information may correspond to the extent to which a complete sentence data structure is included in the translation request 306. For instance, a sentence data structure may include the state information label "UNSTABLE." An example of a sentence data structure with state information "UNSTABLE" may be a sentence being transcribed by an ASR system that has yet to be completed. Subsequent translation requests may contain sentence data structures with text strings that are updates to the previous partial sentences, which can be directly consumed by the translation service for updated translation. Updates may include revisions to previously transcribed partial sentences as well as additional partial sentences. In some examples, state information labels may be included in application logs, application performance statistics, or in other outputs. For example, a translation request 306 initially marked as "UNSTABLE" may later be updated to a "PARTIAL" or "FINAL" state, depending on whether a complete sentence is ultimately translated. The "PARTIAL" or "FINAL" state information may be used to indicate the completeness of the translation to the user.

A queue processor 314 may dequeue sentence data structures from the indexed queue 312 according to a process corresponding to the particular queue implementation, as will be discussed in detail in FIGS. 4-6. The queue processor 314 may be implemented as a consumer thread. The queue processor 314 may dequeue one or more sentence data structures from the indexed queue 312 and add them to a translation buffer included in a translator 316. The translator 316 may attempt to translate the sentence data structures. The translation service 304 may send a translation response 320 to the client device 302. The translator 316 may generate the translation response 320 including one or more text data structures and their associated translated sentence data structures. A plurality of translation responses 320, 322 may be returned to a plurality of client devices 302, 303. The translation responses 320, 322 may include an API call to an API endpoint labeled "DecodeResponse" that may cause the client devices 302, 303 to perform certain operations. In some examples, "DecodeResponse" may identify a data structure. For example, the translation responses 320, 322 may include one or more text data structures containing translated sentence data structures.

Figure 4:
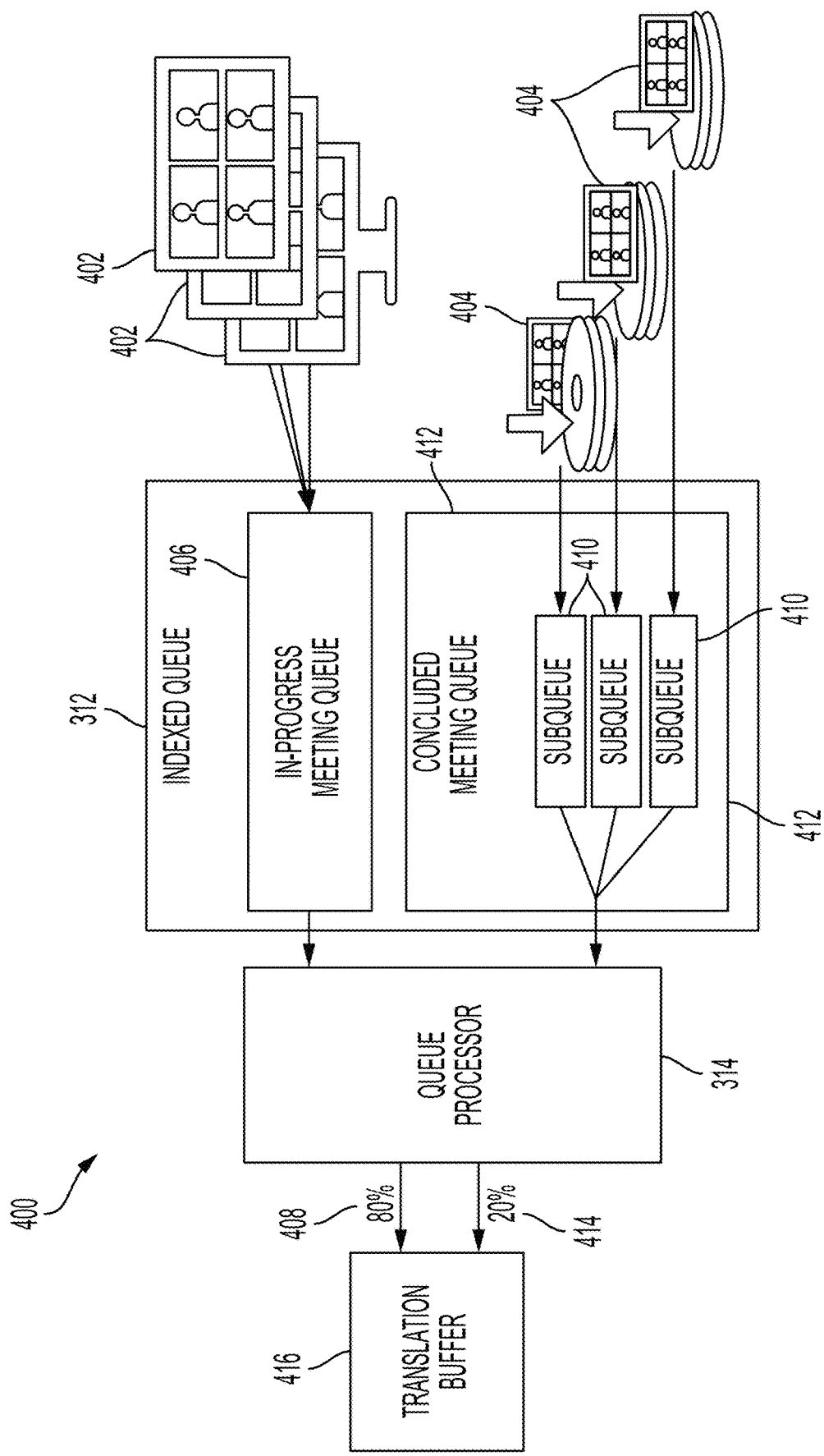
FIG. 4 shows an example of a system for priority-based scheduling of translation requests according to this disclosure.

Turning next to FIG. 4, FIG. 4 shows an example of a system 400 for priority-based scheduling of translation requests according to this disclosure. Indexed queue 312 contains one or more subqueues corresponding to different types of translation requests. For example, the indexed queue 312 may contain a subqueue that is an in-progress meeting queue 406. The in-progress meeting queue 406 may be implemented as a FIFO queue. In a FIFO queue, the first object enqueued, or pushed, is the first object dequeued, or popped. One or more in-progress meetings 402 send translation requests to the translation service 304 which are enqueued in the in-progress meeting queue 406. The in-progress meeting queue 406 is assigned an in-progress meeting queue priority 408. In the example shown, the in-progress meeting queue 406 has an in-progress meeting queue priority 408 value of 80%. The priority may be expressed as a percentage, a decimal, a ratio, an integer weight, or other suitable value for determining the proportion of elements that are dequeued from the in-progress meeting queue 406 in a given translation round.

The indexed queue 312 contains a subqueue that is a concluded meeting queue 412. The concluded meeting queue 412 itself is composed of subqueues 410. The subqueues 410 may be implemented as FIFO queues. The concluded meeting queue 412 may be implemented as a Fairly-scheduled First-In-First-Out ("FairFIFO") queue. A FairFIFO queue is a multi-level queue containing one or more subqueues. Elements pushed to a FairFIFO queue are enqueued in a specific subqueue according to a predetermined mapping or procedure. For instance, elements may include an identifier that corresponds to a particular subqueue. For each subqueue, elements are enqueued in accordance with a FIFO scheme. Elements are popped from a FairFIFO queue by dequeuing at least one element from each subqueue in a rotating, "round-robin" fashion. The element dequeued from each subqueue is dequeued according to a FIFO scheme.

For example, translation requests may be dequeued from the concluded meeting queue 412 by the queue processor 314 such that requests are dequeued from the subqueues 410 of the concluded meeting queue 412 in a "round-robin" fashion. One or more concluded meetings 404 send translation requests to the translation service 304 which are enqueued in the concluded meeting queue 412. The concluded meeting queue 412 is assigned a concluded meeting queue priority 414. In the example shown, the in-progress meeting queue 410 has a concluded meeting queue priority 414 value of 20%. The priority may be expressed as a percentage, a decimal, a ratio, an integer weight, or other suitable value for determining the proportion of elements that are dequeued from the concluded meeting queue 412 in a given translation round. A weight may be converted to a percentage/decimal representation by summing the weights for all subqueues of the indexed queue 312 and dividing each weight by that sum. For example, the in-progress meeting queue priority 408 value of 80% (0.8) and concluded meeting queue priority 414 value of 20% (0.2) are equivalent to weights 8 and 2, respectively.

The multiple subqueue implementations of the indexed queue 312 can ensure that the latency of in-progress meeting translation requests is minimized while the throughput of concluded meeting translation requests is maximized. In-progress meeting translation requests may require low latency because of the requirement for near-real-time translations. In this context, latency refers to the amount of time the translation service 304 takes to translate an in-progress meeting translation request. In contrast, concluded meeting translation requests may not have a latency requirement because they are not being consumed in real-time. However, client devices submitting concluded meeting translation requests may still desire translations of concluded meetings in reasonable periods of time or partial translations in short periods of time. Because concluded meeting translation requests are received by the translation service 304 as batch requests, if the concluded meeting queue 412 used a FIFO scheme, earlier concluded meeting requests would block later concluded meeting requests from processing. Therefore, the concluded meeting queue 412 is implemented as a FairFIFO queue in which dequeuing requests from the FIFO subqueues of the concluded meeting queue 412 in a "round robin" fashion ensures a high throughput for concluded meeting requests. In this context, throughput refers to the number of concluded meeting translation requests corresponding to different concluded meetings that may be concurrently available for dequeuing in the concluded meeting queue 412 in a round-robin fashion.

In some examples, a FairFIFO queue may be used for other applications. For instance, a FairFIFO queue may be used for translation of chat messages. Chat messages may have a latency requirement comparable with that required for in-progress meeting translations, but may still be sent from client devices in volumes comparable to a transcript of a concluded meeting. As with concluded video, a queue for chat messages may be configured to maximize throughput by dequeuing requests from the from one or more FIFO subqueues corresponding to one or more chat channels in a "round robin" fashion. However, the use of a FairFIFO queue for translating chat messages is just an example. It should be stressed that any queue implementation could be used in a subqueue of the indexed queue 312 according to the specific requirements of translating a given application. For example, subqueues of the indexed queue 312 may be implemented as linked lists, priority queues, dequeues, blocking queues, delayed queues, synchronous queues, transfer queues, or any other suitable implementation.

The queue processor 314 dequeues one or more sentence data structures from the in-progress meeting queue 406 and the concluded meeting queue 412 according to the priorities of those queues and insert them into a translation buffer 416 which may be provided as input to the translator 316 for translation. For example, if the in-progress meeting queue priority 408 is 80% and the concluded meeting queue priority 414 is 20%, the translation buffer 416 may be 80% filled with sentence data structures from the in-progress meeting queue 406 and 20% filled from the concluded meeting queue 412. In some cases, additional steps may be needed to fully populate the translation buffer 416. For example, if insufficient elements are available from one queue, elements may be drawn from another queue in descending order of queue priority. The mechanism for populating the translation buffer 416 is fully described in the description of FIG. 7.

Figure 5:
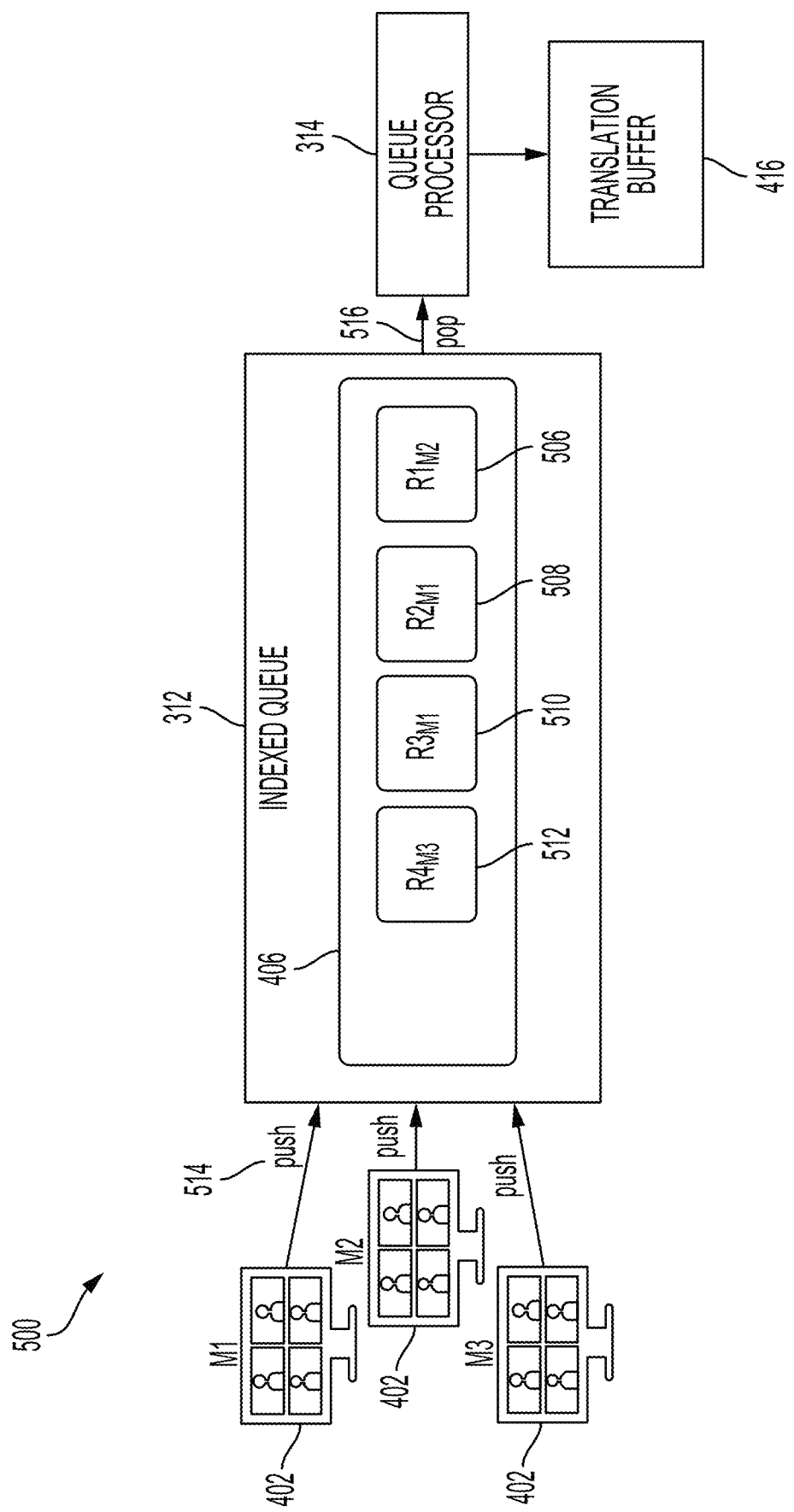
FIG. 5 shows an illustration of an example in-progress meeting queue for priority-based scheduling of translation requests according to some aspects of this disclosure.

Turning next to FIG. 5, FIG. 5 shows an illustration of an example in-progress meeting queue 500 for priority-based scheduling of translation requests according to some aspects of this disclosure. Participants in in-progress meetings 402 may request near-real-time translations. The video conference provider 110 may create near-real-time transcripts of in-progress meetings 402 and send in-progress meeting translation requests including the transcripts to the translation service 304. The video conference provider 110 may use ASR to convert the audio from in-progress meetings 402 into partial transcripts. The partial transcript of the in-progress meeting may be sent to the translation service 304. In some examples, the video conference provider 110 may send a partial transcript to the translation service 304, followed by additional portions of the partial transcript as they are transcribed by the ASR, including the newly transcribed portions. In this way, the indexed queue 312 of the translation service 304 may enqueue an in-progress meeting translation request and then later update the enqueued in-progress meeting translation request with additional transcribed data. Alternatively, the translation service 304 may partially translate an in-progress meeting translation request and then later complete the translation as the additional transcribed text becomes available. For example, a participant in an in-progress meeting may speak the sentence "How are you doing?" The video conference provider 110 may transcribe the first portion as "How are" and submit it to the translation service 304 as an in-progress meeting translation request. The video conference provider 110 may then complete the transcription "How are you" and submit it as another in-progress meeting translation request. The video conference provider 110 may complete the transcription "How are you doing" and submit yet another in-progress meeting translation request. In this example, one spoken sentence results in three in-progress meeting translation requests. By beginning to partially translate with the available transcribed text, the translation service 304 is able to provide near-real-time translations. In the event that the earlier portions of the transcript are enqueued and not yet translated, the indexed queue 312 may update the enqueued sentence data structures with the additional transcript portions as they are received.

The in-progress meeting translation requests are enqueued in the in-progress meeting queue 406 that is a subqueue of the indexed queue 312. The in-progress meeting queue 406 may be implemented as a FIFO queue in which elements get added into the queue in the order that they arrive. In other words, the in-progress meetings 402 may enqueue translation requests in real-time. This approach may be sufficient to provide near-real-time translations for in-progress meetings since the natural time distribution of human speech and normal variation in request rate between different meetings result in translation requests that can be timely processed as-received without any additional scheduling procedures, while still achieving the desired latency.

In-progress meeting translation requests are pushed 514 onto the in-progress meeting queue 406 by the indexed queue 312 according to a FIFO scheme. In this illustration, the in-progress meeting translation requests are labeled for convenience using the labeling scheme $RX_{MY}$, where X corresponds to the chronological ordering of the enqueuing of the translation requests and Y refers to one of the in-progress meetings 402. For example, R3$_{M1}$ refers to the third request 510 in the queue from in-progress meeting labeled M1 among the in-progress meetings 402. The translation requests are pushed 514 into the in-progress meeting queue 406 in the chronological order that they are received by the indexed queue 312 irrespective of the which of the in-progress meetings 402 they originated from. Likewise, the in-progress meeting translation requests are popped 516 by the queue processor 314 in the order in which they were enqueued, according to the FIFO scheme. In this illustration, the enqueued requests are, in order of pushing 514, first request 506, second request 508, third request 510, and fourth request 512. In order of popping 516, the first request 506 will be popped first, followed by the second request 508, the third request 510, and the fourth request 512. The queue processor 314 pops 516 requests to fill the translation buffer 416 from which the translator 316 draws translation tasks.

Figure 6:
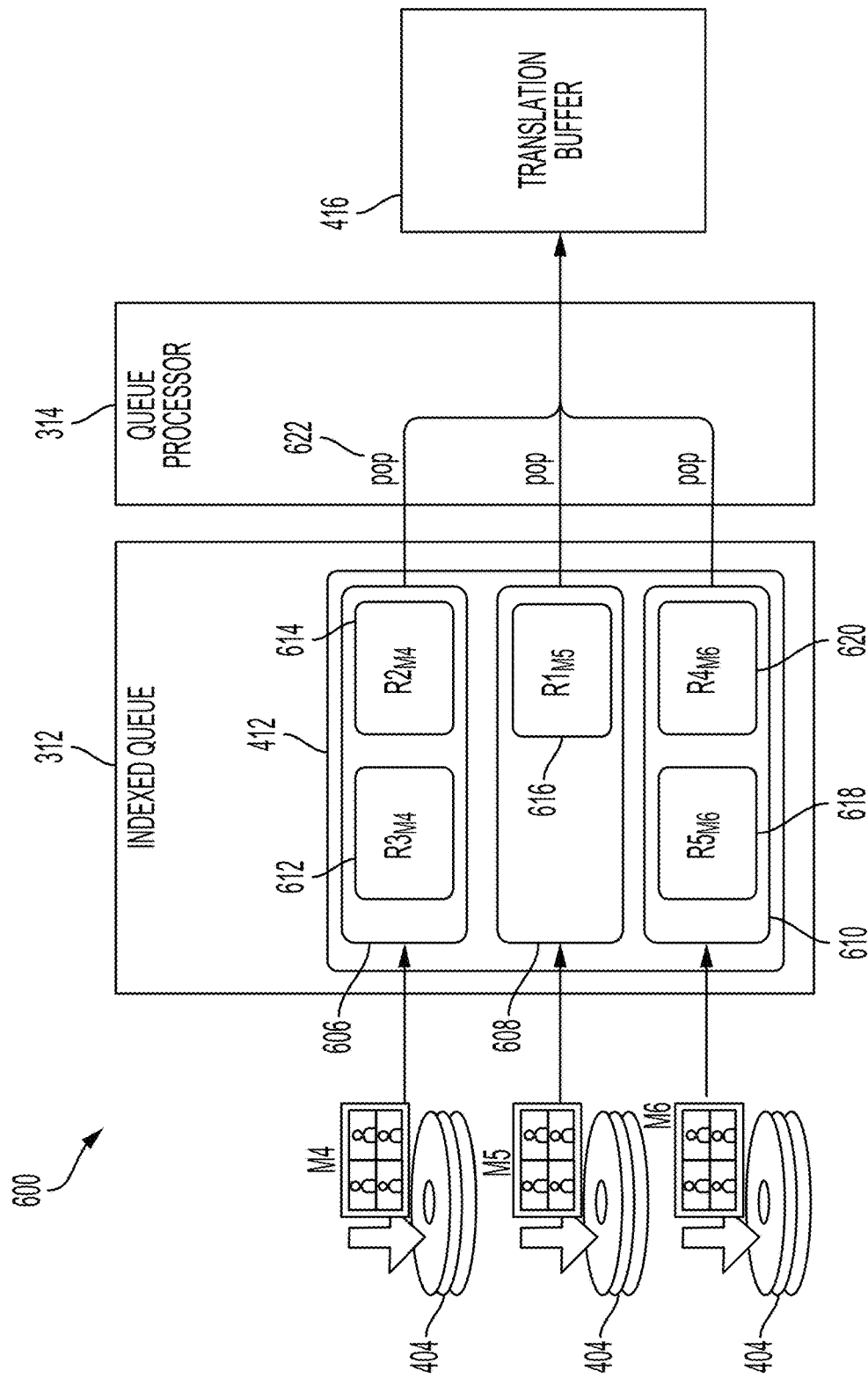
FIG. 6 shows an illustration of an example concluded meeting queue for priority-based scheduling of translation requests according to some aspects of this disclosure.

Turning next to FIG. 6, FIG. 6 shows an illustration of an example concluded meeting queue 600 for priority-based scheduling of translation requests according to some aspects of this disclosure. Participants in concluded meetings 404 may request translations. The video conference provider 110 may create transcripts of concluded meetings 404 and send concluded meeting translation requests to the translation service 304. The concluded meeting translation requests may be sent to the translation service 304 from the client device 302 as one or more batches of requests. For example, a transcript of a concluded meeting may be provided to the client device 302 by the video conference provider 110. The client device 302 can convert the transcript into one or more concluded meeting translation requests containing batches of sentences for translation. The batch size may be set according to an empirically derived configuration parameter related to the throughput requirements of the translation service 304. In some examples, the batch size may correspond to the capacity of the translator 316. In some other examples, the client devices 302 may send batches of any size to the translation service 304. A component of the translation service 304 may then process incoming batches and further divide them into sub-batches that correspond to the capacity of the translator 316 or some other configuration parameter.

In some examples, the video conference provider 110 may provide a partial transcript to the client device 302, followed by additional portions of the transcript as they are transcribed, followed ultimately by the completed transcript. The client device 302 can create batches of concluded meeting translation requests as the transcript portions are available and submit them to the translation service 304 for translation. In this way, the translation service 304 may begin translating and complete a partial translation before the completed transcript is available. For example, a participant in a concluded meeting may request a translation and begin to receive a partial translation immediately, followed by additional portions of the translation as they become available.

In some embodiments, the transcript of the concluded meeting may be sent to the translation service 304. A component of the translation service 304 may convert the transcript into a plurality of concluded meeting translation requests. For example, the component may convert the transcript into a plurality of concluded meeting translation requests, resulting in a batch of concluded meeting translation requests. In this embodiment, the component of the translation service 304, rather than client devices 302, 303 generate the translation requests 306, 308.

The concluded meeting translation requests are enqueued in the concluded meeting queue 412 that is a subqueue of the indexed queue 312. The concluded meeting queue 412 may be implemented as one or more subqueues, each of which corresponds to a concluded meeting. In some examples, there is a one-to-one correspondence between the subqueues of the concluded meeting queue 412 and the concluded meetings 404. In some other examples, the concluded meeting queue 412 may contain a predetermined, fixed number of subqueues. The fixed number of subqueues may be the maximum number of concluded meetings 404 that may be simultaneously associated with the translation service 304 at one time. Alternatively, subqueues may be shared among concluded meetings 404 according to a sharing algorithm. For example, concluded meeting translation requests could be evenly distributed between two subqueues. The concluded meeting queue 412 may be a FairFIFO queue, which may include an internal scheduling mechanism within the concluded meeting queue 412 that may be configured to maximize throughput by fairly fetching requests for translation from all concluded meeting translation requests that are concurrently enqueued in order to maximize throughput. The internal scheduling mechanism may include round-robin dequeuing of requests from the subqueues making up the concluded meeting queue 412. Round-robin dequeuing may include popping 622 in a circular manner from the requests from all the concluded meetings that are concurrently enqueued for translation. The subqueues making up the concluded meeting queue 412 may be implemented using a FIFO scheme or other suitable queueing mechanism. The round-robin dequeuing may be implemented by the queue processor 314 or by a read buffer included in the indexed queue 312.

In this illustration, the concluded meeting translation requests are labeled for convenience using the labeling scheme RX$_{MY}$, where X corresponds to the chronological ordering of the enqueuing of the translation requests and Y refers to one of the concluded meetings 404. For example, R2$_{M4}$ refers to the first request 614 in the first subqueue 606 corresponding to the concluded meeting labeled M4 among the concluded meetings 404 that is the second request received chronologically. The translation requests are pushed into the concluded meeting queue 412 by the indexed queue 312. The indexed queue 312 may determine if a subqueue corresponding to the concluded meeting that originated the concluded meeting translation request exists. If it does not exist, the indexed queue 312 may create a new subqueue corresponding to the concluded meeting that originated the concluded meeting translation request. The concluded meeting translation requests are pushed by the indexed queue 312 into the subqueue of the concluded meeting queue 412 corresponding to the concluded meeting that originated the concluded meeting translation request in the chronological order that they are received. The requests in each subqueue of the concluded meeting queue 412 may be a subportion of the textual information included in the concluded meeting translation request sent from the client device 302. The queue processor 314 may pop requests from the concluded meeting queue 412 in a round-robin fashion. For example, the first-enqueued request of a first subqueue would be dequeued, followed by the first-enqueued request of a second subqueue, followed by the first-enqueued request of a third subqueue, then followed by the second-enqueued request of the first subqueue, the second-enqueued request of the second subqueue, and so on. Each popped request may be a subportion of the textual information included in the concluded meeting translation request sent from the client device 302. The round-robin dequeuing may be coordinated by way of an associated ring buffer to keep track of the order of concluded meetings 404. A ring buffer is a queue implementation that functions as if the last position in the queue is connected to the first position. In addition, the concluded meeting queue 412 may have an associated index corresponding to the subqueue of the concluded meeting queue 412 for which to dequeue the next request from. The index may be, for example, a unique identifier of a given concluded meeting. In some examples, when all requests from the subqueue corresponding to the concluded meeting that originated the concluded meeting translation request have been dequeued, the subqueue may be deleted.

In this illustration, the concluded meeting queue 412 contains subqueues 606, 608, and 610, corresponding to concluded meetings M4, M5, and M6, respectively. First request 614 was enqueued first in first subqueue 606. Second request 612 was enqueued second in first subqueue 606. Third request 616 was enqueued first in second subqueue 608 and is the only request in second subqueue 608. Fourth request 620 was enqueued first in third subqueue 610 and fifth request 618 was enqueued second in third subqueue 610. The ordering of the subqueues 606, 608, and 610 shown in the illustration corresponds to their order in the ring buffer. Elements are popped from the subqueues making up the concluded meeting queue in a round-robin fashion beginning with the first request in each subqueue. First request 614 is popped first, followed by third request 616, then fourth request 620 from the third subqueue 610. The queue processor 314 may then revert to the first subqueue 606. Second request 612 is popped followed by fifth request 618. The queue processor 314 may pop requests to fill the translation buffer 416.

Figure 7:
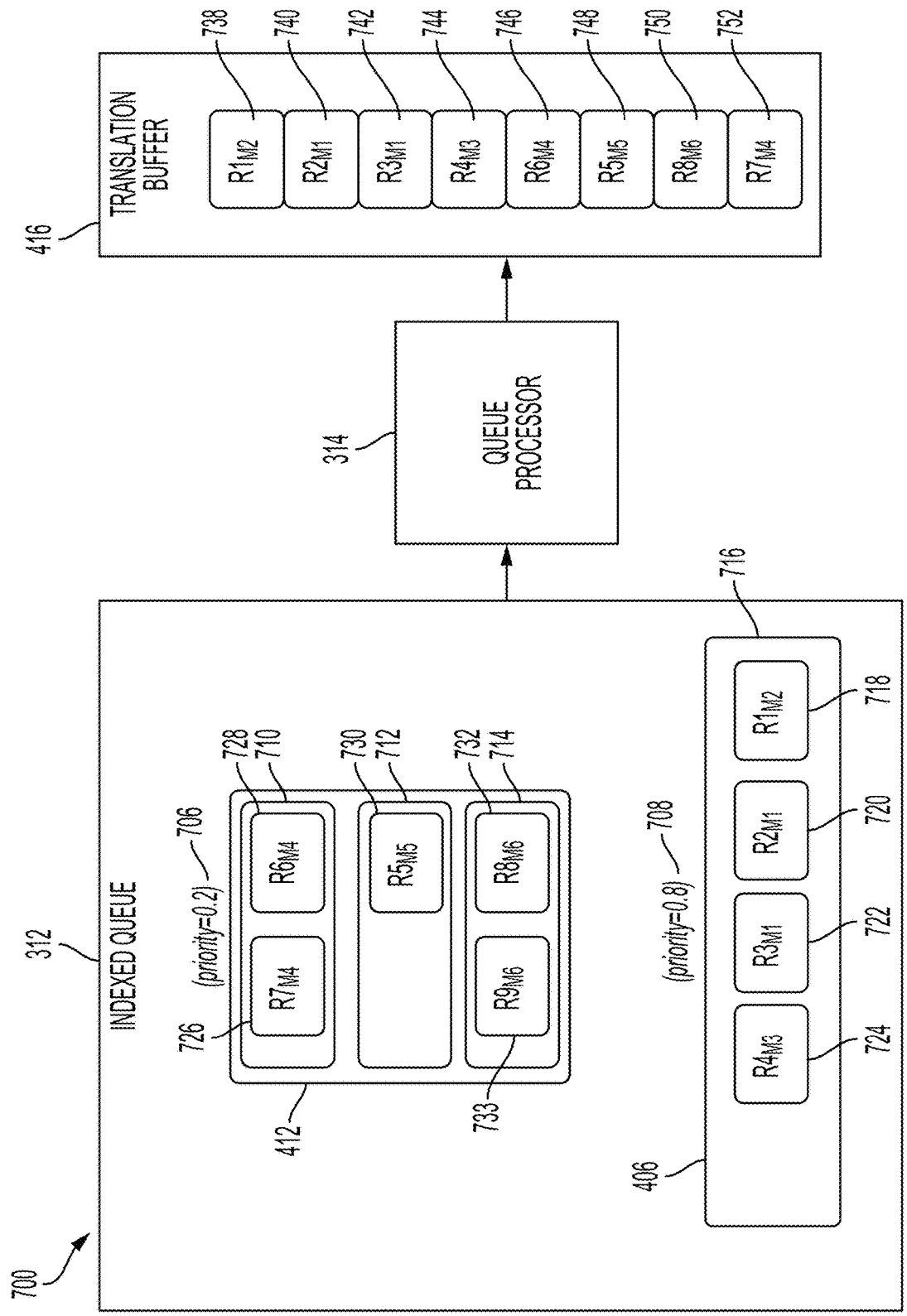
FIG. 7 shows an illustration of an example queue processor for priority-based scheduling of translation requests according to some aspects of this disclosure.

Turning next to FIG. 7, FIG. 7 shows an illustration of an example queue processor 700 for priority-based scheduling of translation requests according to some aspects of this disclosure. Translation may proceed in rounds, wherein the queue processor 314 dequeues requests from the in-progress meeting queue 406 and concluded meeting queue 412 making up the indexed queue 312 to a translation buffer 416 at fixed time intervals or other suitable frequency. For example, the queue processor 314 may dequeue requests every 200 milliseconds. In some examples, if there are insufficient requests available between the in-progress meeting queue 406 and concluded meeting queue 412, the queue processor 314 may delay populating the translation buffer 416 for a specified period of time to await further translation requests. The translator 316 may then read from the translation buffer 416 and perform the translation. Requests from the in-progress meeting queue 406 and concluded meeting queue 412 may be dequeued according to a specified priority of each queue. For example, the in-progress meeting queue 406 is assigned an in-progress meeting priority 708 of 0.8, while the concluded meeting queue 412 is assigned a concluded meeting priority 706 of 0.2. For each round of translation, the queue processor 314 pops a number of elements from the concluded meeting queue 412 equal to the size of the translation buffer 416 multiplied by the fraction 0.2. Likewise, the queue processor 314 pops a number of elements from the in-progress meeting queue 406 equal to the size of the translation buffer 416 multiplied by the fraction 0.8. For example, for a translation buffer 416 size of 8, this would result in 2 concluded meeting translation requests and 6 in-progress meeting translation requests per round of translation. In this example, when an element is dequeued from the concluded meeting queue 412, the request may be taken from the FIFO subqueue of the concluded meeting queue 412 corresponding to the current index value, which is then incremented to the next subqueue identified on the ring buffer. Likewise, when an element is dequeued from the in-progress meeting queue 406, the request that is popped is the first one that was received by the in-progress meeting queue 406 chronologically.

The in-progress meeting priority 708 and the concluded meeting priority 706 may be chosen according to any suitable method. For example, the in-progress meeting priority 708 and the concluded meeting priority 706 may be chosen based on empirical testing. The values chosen may satisfy the joint needs of low latency for the in-progress meeting queue 406 and high throughput for the concluded meeting queue 412. In another example, the in-progress meeting priority 708 and the concluded meeting priority 706 may be configurable parameters that vary according to the current state of the system 300. For instance, the in-progress meeting priority 708 may be increased during times when heavy volumes of in-progress meeting translation requests are expected. Additional subqueues may be added to the indexed queue 312 corresponding to different application or other translation needs. Priorities for those additional queues may be chosen using similar methods.

In some examples, the translation buffer 416 may not be filled to capacity in a given translation round. For example, using the sizes and priorities from the previous example, if the in-progress meeting queue 406 only has 4 elements available for dequeuing, then in addition to the 2 already dequeued from the concluded meeting queue 412, the queue processor 314 may dequeue 4 additional elements from the concluded meeting queue 412 to fill the translation buffer 416, for a total of 8 requests. In other words, the queue processor 314 may dequeue a total number of elements from the concluded meeting queue 412 equal to the difference between the size of the translation buffer 416 (8) and the number of elements dequeued from the in-progress meeting queue 406 (4). By ensuring that the translation buffer 416 is always full, the queue processor 314 may ensure that computational resources are used efficiently. In examples in which the indexed queue 312 includes more than 2 subqueues, the queue processor 314 may select additional elements to populate the translation buffer from the subqueue with the highest priority containing requests. For example, for an indexed queue 312 with 3 subqueues with priority values 50%, 30%, and 20%, respectively, the 30% priority subqueue may not have enough elements to populate the translation buffer 416 in a round of translation. In that event, the queue processor 314 may draw additional requests beyond the proportional share of the translation buffer size from the first-highest priority queue, which is the 50% subqueue. If there are insufficient requests to fully populate the translation buffer 416 in the 50% subqueue, then additional requests may be drawn from the subqueue with the next-highest priority, the 20% subqueue.

In this illustration, in-progress and concluded meeting translation requests are labeled for convenience using the labeling scheme $RX_{MY}$, where X corresponds to the chronological ordering of the enqueuing of the translation requests and Y refers to one of the in-progress meetings 402 or concluded meetings 404. In this illustration, concluded meeting queue 412 includes first subqueue 710, second subqueue 712, and third subqueue 714 corresponding to concluded meetings M4, M5, and M6, respectively. The indexed queue 312 pushes requests to the in-progress meeting queue 406 according to a FIFO scheme. In this illustration, the in-progress meeting queue 406 is populated chronologically before the concluded meeting queue 412. The first request 718 is pushed first, followed by the second request 720, the third request 722, and the fourth request 724. The fifth request 730 is pushed to the second subqueue 712 corresponding to concluded meeting M5. The sixth request 728 and the seventh request 726 are then pushed to the first subqueue 710 corresponding to concluded meeting M4. The eighth request 732 and ninth request 733 are pushed to the third subqueue 714 corresponding to concluded meeting M6.

During a round of translation, the queue processor 314 inserts requests into the translation buffer 416 according to the priorities of the in-progress meeting queue 406 and the concluded meeting queue 412. In this illustration, the translation buffer 416 has a size of 8. The in-progress meeting priority 708 is 0.8. Therefore, the queue processor 314 may dequeue 8×0.8=6.4 requests from the in-progress meeting queue 406. In some examples, when the priority multiplied by the translation buffer size results in a fractional element, the queued processor may round down to the nearest integer number of elements, in this example, 6. However, some implementations may round up or choose the rounding strategy according to a different scheme. In this illustration, the in-progress meeting queue 406 has insufficient requests to populate its share of the translation buffer 416, 6 elements. The queue processor dequeues all 4 elements from the in-progress meeting queue 406, and then fills all remaining openings in the translation buffer 416 with elements from the concluded meeting queue 412, despite the remaining number of openings exceeding 8×0.2=1.6 elements. In this illustration, the translation buffer 416 is populated first from the in-progress meeting queue 406 with the first request 718, 738, the second request 720, 740, the third request 722, 742, and the fourth request 724, 744. Requests are dequeued from the concluded meeting queue 412 in a round-robin fashion, beginning with the current index value, which is then incremented to the next subqueue on the ring buffer. The remainder of the translation buffer 416 is populated with the sixth request 728, 746, the fifth request 730, 748, and then the eighth request 732, 750. The queue processor 314 then returns to the first subqueue 710 and fills the final opening in the translation buffer 416 with the seventh request 726, 752. The ninth request 733 will not be enqueued until the next round of translation.

Figure 8:
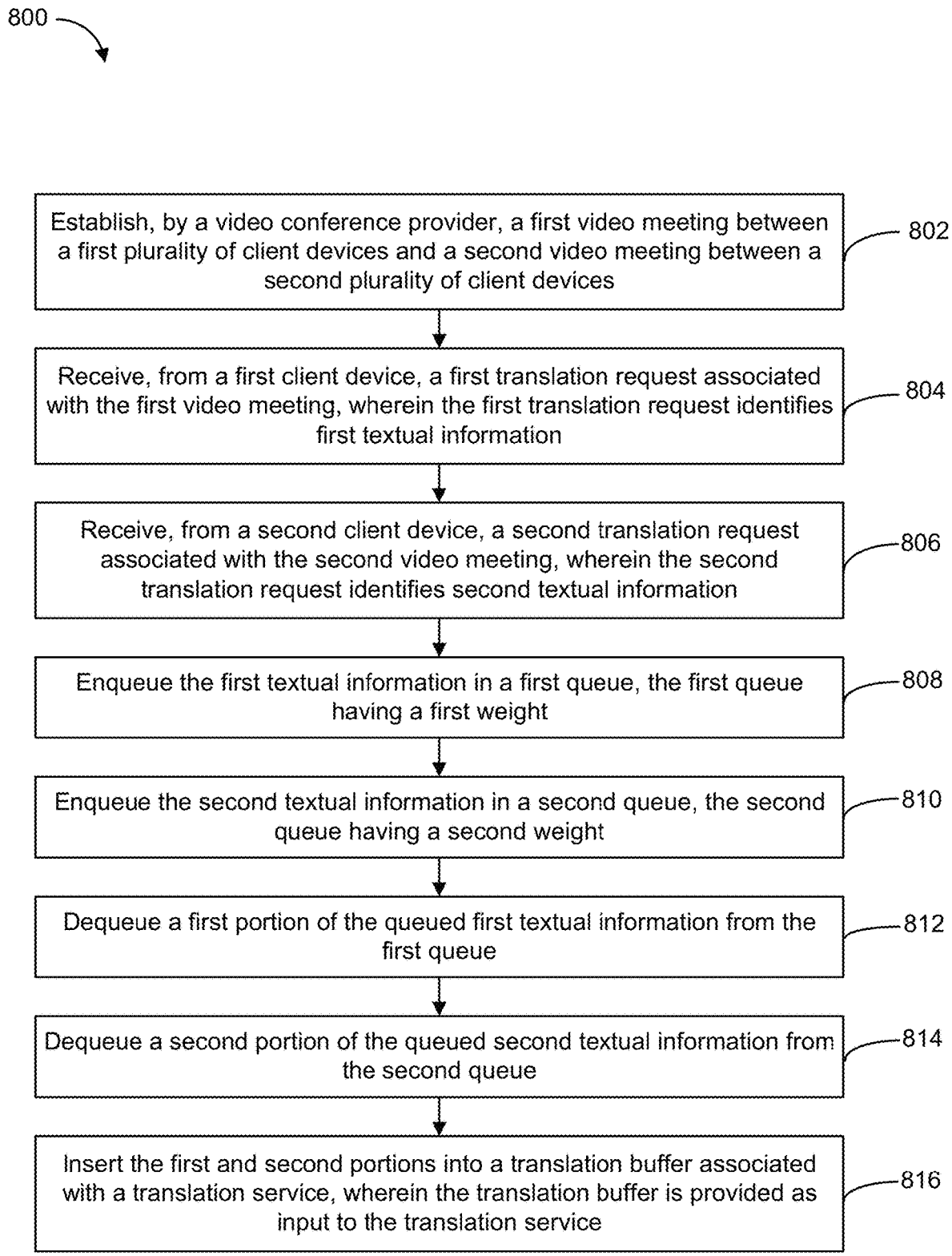
FIG. 8 shows a flowchart of an example method for priority-based scheduling of translation requests according to some aspects of this disclosure.

Referring now to FIG. 8, FIG. 8 shows a flowchart of an example method 800 for priority-based scheduling of translation requests according to some aspects of this disclosure. The description of the method 800 in FIG. 8 will be made with reference to FIGS. 3-7, however any suitable system according to this disclosure may be used, such as the example systems 100 and 200, shown in FIGS. 1 and 2.

It should be appreciated that method 800 provides a particular method for priority-based scheduling of translation requests. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For instance, an application may transmit directly to a video conference provider and/or via a client software. One of ordinary skill in the art would recognize many variations, modifications, and alternatives.

The method 800 may include block 802. In block 802, a video conference provider 110 may establish a first video meeting between a first plurality of client devices and a second video meeting between a second plurality of client devices. The first and second video meetings may be in-progress meetings or concluded meetings. For illustrative purposes, it will be assumed that the first meeting is an in-progress meeting and the second meeting is a concluded meeting. The first video meeting and the second video meeting may be recorded and may include one or more audio streams with video meeting participants speaking in one or more languages. Participants in the in-progress first video meeting may desire real-time translation of other participants' audio streams. Participants in the concluded second video meeting may desire translations of the recorded meeting audio to review during playback. For example, participants in the second video meeting may play back the recording of the concluded second video meeting and the client device may display the translation during playback.

The method 800 may include block 804. In block 804, a computing device may receive, from a first client device, a first translation request associated with the first video meeting, wherein the first translation request identifies first textual information. The first meeting may be an in-progress meeting. In that case, the first client device may generate real-time transcriptions of the meeting audio using, for example, an ASR system. Alternatively, the real-time transcript may be obtained by submitting audio to the video conference provider 110 for transcription. Because the system 300 is configured to provide minimum latency for translations of in-progress meetings, the first client device may generate the first translation request immediately upon completion of audio transcription, for example, without regard to whether it contains complete sentences. The first translation request may identify first textual information comprising some or all of the available transcribed real-time audio. For example, the first textual information may include a text data structures that include one or more sentence data structures. The sentence data structures may include sentence fragments, single sentences, or multiple sentences. The client device may be configured to send the first translation request to the translation service 304 as soon as any amount of textual information is transcribed, as soon as a minimum amount of textual information is transcribed, at pre-set time intervals, or according to another algorithm selected to minimize latency of real-time translation requests.

The method 800 may include block 806. In block 806, a computing device may receive, from a second client device, a second translation request associated with the second video meeting, wherein the second translation request identifies second textual information. The second video meeting may be a concluded video meeting. The second client device may submit the recorded audio of the recorded second video meeting to the video conference provider 110 for transcription. In some examples, the recorded audio may be transcribed by the second client device using an ASR system or other method of transcription. The second client device may send, to the translation service 304, the second translation request including second textual information comprising some or all of the transcribed recorded audio. In some examples, the second textual information may include one or more text data structures, or batches of text data structures, that themselves include one or more sentence data structures. The client device may generate batches of text data structures corresponding to some portion or all of the transcript of the recorded second video meeting. In other words, the second textual information may include one or more concluded meeting translation requests, each of which contains one or more text data structures. The batch size may be determined according to an empirically derived configuration parameter related to the throughput requirements of the translation service 304. In some examples, the batch size may correspond to the capacity of the translator 316. In some other examples, the client devices 302 may send batches of any size to the translation service 304. A component of the translation service 304 may then process incoming batches and further divide them into sub-batches that correspond to the capacity of the translator 316 or some other configuration parameter. In some examples, the second client device may send a batch of text data structures to the translation service 304 corresponding to a partially transcribed concluded meeting. The second client device may send additional batches of text data structures to the translation service 304 as the transcription proceeds.

The method 800 may include block 808. In block 808, the translation service 304 may enqueue the first textual information in a first queue, the first queue having a first weight. For example, the first queue may be a FIFO queue that is a subqueue of an indexed queue. For the in-progress first video meeting, the first textual information included in the first translation request may be enqueued chronologically in the first queue, as the requests arrive, in order to achieve a desired minimum latency for in-progress meeting translations. The first textual information may include a text data structure. For example, the first textual information may contain a text data structure, which contains one or more sentence data structures, which may be enqueued as a single queue element. In other examples, the first textual information may be enqueued according to a different algorithm. For example, in some implementations, each sentence data structure making up the text data structures may be enqueued as a separate element in the first queue. In some examples, the first queue may have a maximum number of elements. In the event that the first textual information cannot be enqueued due to the queue lacking available space, the first textual information may be sent to a different translation service instance. In some implementations, in lieu of a maximum queue size, capacity is managed by limiting the number of concurrent connections to the translation service 304. This has the effect of limiting the translation service 304 to serving a specified number of in-progress and concluded meetings concurrently. The number of concurrent connections may be determined according to an empirically derived configuration parameter related to the throughput and latency requirements of the translation service 304 or other suitable procedure.

The method 800 may include block 810. In block 810, the translation service 304 may enqueue the second textual information in a second queue, the second queue having a second weight. For example, the second queue may be a FairFIFO queue that is a subqueue of the indexed queue. In a FairFIFO queue, the second textual information included in the second translation request may be enqueued in a subqueue of the second queue corresponding to the concluded second video meeting. If a subqueue corresponding to the concluded second video meeting does not exist, in some implementations, it may be created. A ring buffer may be updated to include a reference to the newly created subqueue. The ring buffer may have an associated index indicating the next subqueue scheduled for dequeuing. The second textual information may contain one or more batches of text data structures for translation. For example, the second textual information may contain one or more batches, each of which contains one or more text data structures, each of which contains one or more sentence data structures. Each text data structure included in the batch may be enqueued as a single queue element. In other examples, the second textual information may be enqueued according to a different algorithm. For example, in some implementations, each sentence data structure making up the text data structures may be enqueued as a separate element. As with the first queue, the second queue may have a maximum number of elements. In the event that the second textual information cannot be enqueued due to the second queue lacking available space, the second textual information may be sent to a different translation service instance.

The method 800 may include block 812. In block 812, the translation service 304 may dequeue a first portion of the queued first textual information from the first queue. The first portion from the first queue may be dequeued according to a FIFO scheme, such that the textual information that arrived first chronologically is dequeued first. The size of the first portion may be proportional to the first weight. The first weight may be represented as an integer, fraction, percentage, ratio, or any other suitable means for expressing the proportion of the first textual information dequeued from the first queue.

The method 800 may include block 814. In block 814, the translation service 304 may dequeue a second portion of the queued second textual information from the second queue. Textual information from the second queue may be dequeued according to a "round-robin" scheme, wherein the second portion is dequeued from a first subqueue corresponding to the current index of the ring buffer. The index to the ring buffer may be incremented and a portion from the next subqueue indexed on the ring buffer may be dequeued, and so on. Once a request has been dequeued from the last subqueue in the ring buffer, the queue processor 314 may return to the first subqueue, and correspondingly updates the ring buffer index from referencing the last subqueue to reference the first subqueue. The size of the second portion is proportional to the second weight. The second weight may be represented as an integer, fraction, percentage, ratio, or any other suitable means for expressing the proportion of the second textual information dequeued from the second queue.

The method 800 may include block 816. In block 816, the translation service 304 may insert the first and second portions into a translation buffer 416 associated with a translation service, wherein the translation buffer 416 is provided as input to the translator 316. The translation service 304 may insert portions into the translation buffer 416 in rounds, for example, at fixed time intervals. Requests from the first and second queues may be dequeued according to a designated priority of each queue. In other words, the translation buffer may be populated in proportion to weights assigned to each queue. For example, the first queue may be assigned a weight of 3, while the concluded meeting second queue may be assigned a weight of 1. For each round of translation, the translation service 304 may try to select 1 concluded meeting request for every 3 in-progress meeting requests. For example, for a translation buffer size of 8, this would result in 2 concluded meeting requests and 6 in-progress meeting requests per round of translation.

In some cases, there may be insufficient requests to fill the translation buffer 416. For example, in a given translation round, one of the queues may contain fewer requests than its proportional share of the translation buffer 416. In that event, empty slots in the translation buffer 416 may be filled from the first non-empty queue with the highest priority. In implementations with more than two queues, if the first non-empty queue with the highest priority is empty, requests may be drawn from lower priority queues, in descending order of priority. This procedure ensures that the translation buffer 416 is always filled with the maximum number of available request and that fewer computational resources are wasted.

Figure 9:
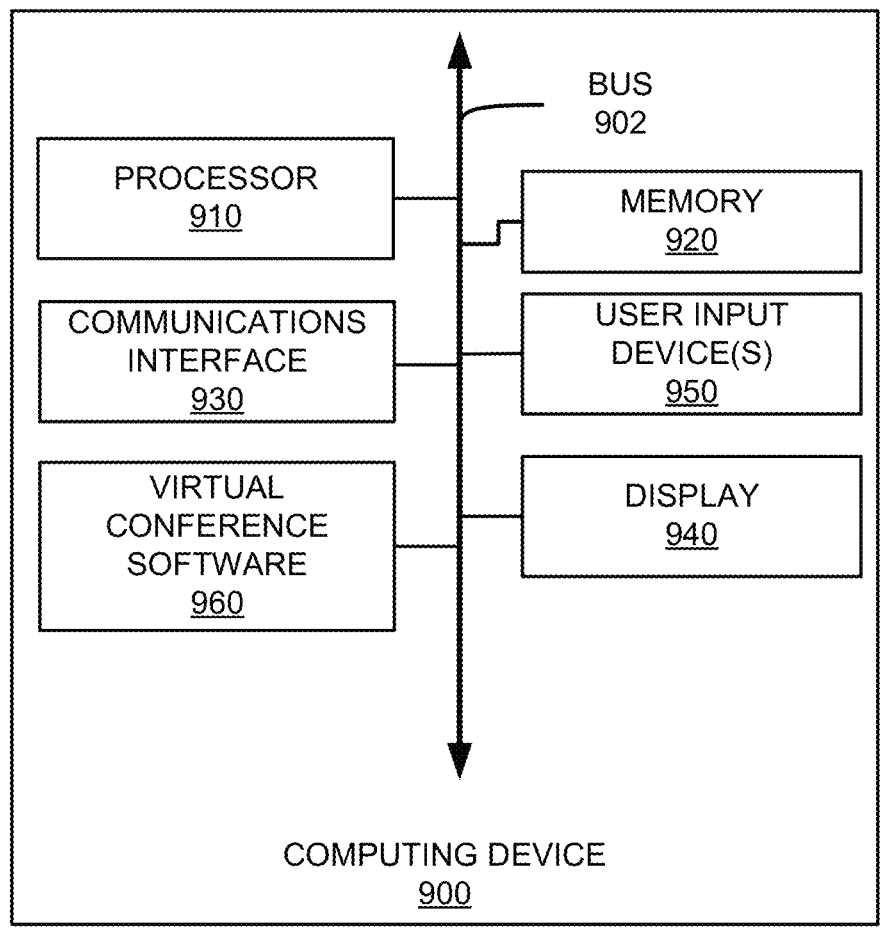
FIG. 9 shows an example computing device suitable for use in example systems or methods for priority-based scheduling of translation requests according to this disclosure.

Referring now to FIG. 9, FIG. 9 shows an example computing device 900 suitable for use in example systems or methods for priority-based scheduling of translation requests according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for priority-based scheduling of translation requests according to different examples, such as the example method 800 described above with respect to FIG. 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a virtual conferencing application 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method for machine translation, comprising: establishing, by a video conference provider, a first video meeting between a first plurality of client devices and a second video meeting between a second plurality of client devices; receiving, from a first client device, a first translation request associated with the first video meeting, wherein the first translation request identifies first textual information; receiving, from a second client device, a second translation request associated with the second video meeting, wherein the second translation request identifies second textual information; enqueuing the first textual information in a first queue, the first queue having a first weight; enqueuing the second textual information in a second queue, the second queue having a second weight; dequeuing a first portion of the queued first textual information from the first queue; dequeuing a second portion of the queued second textual information from the second queue; and inserting the first and second portions into a translation buffer associated with a translation service, wherein the translation buffer is provided as input to the translation service.

Example 2 is the method of example(s) 1, wherein the first portion of the queued first textual information dequeued corresponds to a fraction of the translation buffer in proportion to the first weight and the second portion of the queued second textual information dequeued corresponds to a fraction of the translation buffer in proportion to the second weight.

Example 3 is the method of example(s) 1, wherein: the first translation request is received while the first video meeting is in progress; and the second translation request is received after the second video meeting has concluded and while the first video meeting is in progress.

Example 4 is the method of example(s) 1, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

Example 5 is the method of example(s) 4, further comprising establishing, by the video conference provider, a third video meeting between a third plurality of client devices; receiving, from a third client device, a translation request associated with the third video meeting, wherein the translation request identifies third textual information; and enqueuing the third textual information in the second queue, wherein enqueuing the third textual information in the second queue comprises enqueuing the third textual information in the subqueue corresponding to the third video meeting; dequeuing a third portion of the queued third textual information from the second queue, wherein the third portion of the third textual information dequeued corresponds to a fraction of the translation buffer in proportion to the second weight, comprising: dequeuing, in a circular manner, a first subportion of the second textual information from the subqueue corresponding to the second video meeting; and dequeuing, in a circular manner, a second subportion of the third textual information from the subqueue corresponding to the third video meeting; and inserting the third portion into the translation buffer, wherein the translation buffer is provided as input to the translation service.

Example 6 is the method of example(s) 1, further comprising: establishing, by the video conference provider, a first chat channel between a fourth plurality of client devices; receiving, from a fourth client device, a translation request associated with the first chat channel, wherein the translation request comprises fourth textual information; enqueuing the fourth textual information in a third queue, the third queue having a third weight; dequeuing a fourth portion of the queued fourth textual information from the third queue, wherein the fourth portion of the queued fourth textual information dequeued corresponds to a fraction of the translation buffer in proportion to the third weight; and inserting the fourth portion into the translation buffer, wherein the translation buffer is provided as input to the translation service.

Example 7 is the method of example(s) 1, wherein the first queue is an indexed queue comprising a hash map, the hash map comprising one or more keys and one or more values, wherein: the keys are indexes corresponding to the first textual information and the first video meeting; and the values include the first textual information, wherein enqueuing the first textual information in the first queue comprises enqueuing the indexes corresponding to the keys that correspond to the first textual information and the first video meeting.

Example 8 is the method of example(s) 1, further comprising: determining that the first portion enqueued in the first queue comprises less first textual information than the fraction of the translation buffer in proportion to the first weight; and dequeuing a fifth portion of the second textual information from the second queue, wherein the fifth portion of the second textual information corresponds to a difference between the size of the translation buffer and the fraction of the translation buffer in proportion to the first weight.

Example 9 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, a first video meeting between a first plurality of client devices and a second video meeting between a second plurality of client devices; receive, from a first client device, a first translation request associated with the first video meeting, wherein the first translation request identifies first textual information; receive, from a second client device, a second translation request associated with the second video meeting, wherein the second translation request identifies second textual information; enqueue the first textual information in a first queue, the first queue having a first weight; enqueue the second textual information in a second queue, the second queue having a second weight; dequeue a first portion of the queued first textual information from the first queue; dequeue a second portion of the queued second textual information from the second queue; and insert the first and second portions into a translation buffer associated with a translation service, wherein the translation buffer is provided as input to the translation service.

Example 10 is the system of example(s) 9, wherein the first portion of the queued first textual information dequeued corresponds to a fraction of the translation buffer in proportion to the first weight and the second portion of the queued second textual information dequeued corresponds to a fraction of the translation buffer in proportion to the second weight.

Example 11 is the system of example(s) 9, the first translation request is received while the first video meeting is in progress; and the second translation request is received after the second video meeting has concluded and while the first video meeting is in progress.

Example 12 is the system of example(s) 9, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

Example 13 is the system of example(s) 9, wherein the first queue is an indexed queue comprising a hash map, the hash map comprising one or more keys and one or more values, wherein: the keys are indexes corresponding to the first textual information and the first video meeting; and the values include the first textual information, wherein enqueuing the first textual information in the first queue comprises enqueuing the indexes corresponding to the keys that correspond to the first textual information and the first video meeting.

Example 14 is the system of example(s) 9, further comprising: determining that the first portion enqueued in the first queue comprises less first textual information than the fraction of the translation buffer in proportion to the first weight; and dequeuing a fifth portion of the second textual information from the second queue, wherein the fifth portion of the second textual information corresponds to a difference between the size of the translation buffer and the fraction of the translation buffer in proportion to the first weight.

Example 15 is a non-transitory computer-readable medium comprising processor-executable instructions configured to cause one or more processors to: establish, by a video conference provider, a first video meeting between a first plurality of client devices and a second video meeting between a second plurality of client devices; receive, from a first client device, a first translation request associated with the first video meeting, wherein the first translation request identifies first textual information; receive, from a second client device, a second translation request associated with the second video meeting, wherein the second translation request identifies second textual information; enqueue the first textual information in a first queue, the first queue having a first weight; enqueue the second textual information in a second queue, the second queue having a second weight; dequeue a first portion of the queued first textual information from the first queue; dequeue a second portion of the queued second textual information from the second queue; and insert the first and second portions into a translation buffer associated with a translation service, wherein the translation buffer is provided as input to the translation service.

Example 16 is the non-transitory computer-readable medium of example(s) 15, wherein the first portion of the queued first textual information dequeued corresponds to a fraction of the translation buffer in proportion to the first weight and the second portion of the queued second textual information dequeued corresponds to a fraction of the translation buffer in proportion to the second weight.

Example 17 is the non-transitory computer-readable medium of example(s) 15, the first translation request is received while the first video meeting is in progress; and the second translation request is received after the second video meeting has concluded and while the first video meeting is in progress.

Example 18 is the non-transitory computer-readable medium of example(s) 15, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

Example 19 is the non-transitory computer-readable medium of example(s) 15, wherein the first queue is an indexed queue comprising a hash map, the hash map comprising one or more keys and one or more values, wherein: the keys are indexes corresponding to the first textual information and the first video meeting; and the values include the first textual information, wherein enqueuing the first textual information in the first queue comprises enqueuing the indexes corresponding to the keys that correspond to the first textual information and the first video meeting.

Example 20 is the non-transitory computer-readable medium of example(s) 15, further comprising: determining that the first portion enqueued in the first queue comprises less first textual information than the fraction of the translation buffer in proportion to the first weight; and dequeuing a fifth portion of the second textual information from the second queue, wherein the fifth portion of the second textual information corresponds to a difference between the size of the translation buffer and the fraction of the translation buffer in proportion to the first weight.

That which is claimed is:

1. A method for machine translation, comprising:
   establishing, by a video conference provider, a first video meeting between a first plurality of client devices and a second video meeting between a second plurality of client devices;
   receiving, from a first client device, a first translation request associated with the first video meeting, wherein the first translation request identifies first textual information;
   receiving, from a second client device, a second translation request associated with the second video meeting, wherein the second translation request identifies second textual information;
   enqueuing the first textual information in a first queue, the first queue having a first weight;
   enqueuing the second textual information in a second queue, the second queue having a second weight;
   dequeuing a first portion of the queued first textual information from the first queue;
   dequeuing a second portion of the queued second textual information from the second queue; and
   inserting the first and second portions into a translation buffer associated with a translation service, wherein the translation buffer is provided as input to the translation service.

2. The method of claim 1, wherein the first portion of the queued first textual information dequeued corresponds to a fraction of the translation buffer in proportion to the first weight and the second portion of the queued second textual information dequeued corresponds to a fraction of the translation buffer in proportion to the second weight.

3. The method of claim 1, wherein:
   the first translation request is received while the first video meeting is in progress; and
   the second translation request is received after the second video meeting has concluded and while the first video meeting is in progress.

4. The method of claim 1, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

5. The method of claim 4, further comprising
   establishing, by the video conference provider, a third video meeting between a third plurality of client devices;

receiving, from a third client device, a translation request associated with the third video meeting, wherein the translation request identifies third textual information; and enqueuing the third textual information in the second queue, wherein enqueuing the third textual information in the second queue comprises enqueuing the third textual information in the subqueue corresponding to the third video meeting;

dequeuing a third portion of the queued third textual information from the second queue, wherein the third portion of the third textual information dequeued corresponds to a fraction of the translation buffer in proportion to the second weight, comprising:

dequeuing, in a circular manner, a first subportion of the second textual information from the subqueue corresponding to the second video meeting; and dequeuing, in a circular manner, a second subportion of the third textual information from the subqueue corresponding to the third video meeting; and inserting the third portion into the translation buffer, wherein the translation buffer is provided as input to the translation service.

6. The method of claim 1, further comprising:

establishing, by the video conference provider, a first chat channel between a fourth plurality of client devices;

receiving, from a fourth client device, a translation request associated with the first chat channel, wherein the translation request comprises fourth textual information;

enqueuing the fourth textual information in a third queue, the third queue having a third weight;

dequeuing a fourth portion of the queued fourth textual information from the third queue, wherein the fourth portion of the queued fourth textual information dequeued corresponds to a fraction of the translation buffer in proportion to the third weight; and inserting the fourth portion into the translation buffer, wherein the translation buffer is provided as input to the translation service.

7. The method of claim 1, wherein the first queue is an indexed queue comprising a hash map, the hash map comprising one or more keys and one or more values, wherein:

the keys are indexes corresponding to the first textual information and the first video meeting; and the values include the first textual information, wherein enqueuing the first textual information in the first queue comprises enqueuing the indexes corresponding to the keys that correspond to the first textual information and the first video meeting.

8. The method of claim 1, further comprising:

determining that the first portion enqueued in the first queue comprises less first textual information than the fraction of the translation buffer in proportion to the first weight; and dequeuing a fifth portion of the second textual information from the second queue, wherein the fifth portion of the second textual information corresponds to a difference between the size of the translation buffer and the fraction of the translation buffer in proportion to the first weight.

9. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:

establish, by a video conference provider, a first video meeting between a first plurality of client devices and a second video meeting between a second plurality of client devices;

receive, from a first client device, a first translation request associated with the first video meeting, wherein the first translation request identifies first textual information;

receive, from a second client device, a second translation request associated with the second video meeting, wherein the second translation request identifies second textual information;

enqueue the first textual information in a first queue, the first queue having a first weight;

enqueue the second textual information in a second queue, the second queue having a second weight;

dequeue a first portion of the queued first textual information from the first queue;

dequeue a second portion of the queued second textual information from the second queue; and insert the first and second portions into a translation buffer associated with a translation service, wherein the translation buffer is provided as input to the translation service.

10. The system of claim 9, wherein the first portion of the queued first textual information dequeued corresponds to a fraction of the translation buffer in proportion to the first weight and the second portion of the queued second textual information dequeued corresponds to a fraction of the translation buffer in proportion to the second weight.

11. The system of claim 9, the first translation request is received while the first video meeting is in progress; and the second translation request is received after the second video meeting has concluded and while the first video meeting is in progress.

12. The system of claim 9, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

13. The system of claim 9, wherein the first queue is an indexed queue comprising a hash map, the hash map comprising one or more keys and one or more values, wherein:

the keys are indexes corresponding to the first textual information and the first video meeting; and the values include the first textual information, wherein enqueuing the first textual information in the first queue comprises enqueuing the indexes corresponding to the keys that correspond to the first textual information and the first video meeting.

14. The system of claim 9, further comprising:

determining that the first portion enqueued in the first queue comprises less first textual information than the fraction of the translation buffer in proportion to the first weight; and dequeuing a fifth portion of the second textual information from the second queue, wherein the fifth portion of the second textual information corresponds to a difference between the size of the translation buffer and the fraction of the translation buffer in proportion to the first weight.

15. A non-transitory computer-readable medium comprising processor-executable instructions configured to cause one or more processors to:
- establish, by a video conference provider, a first video meeting between a first plurality of client devices and a second video meeting between a second plurality of client devices;
- receive, from a first client device, a first translation request associated with the first video meeting, wherein the first translation request identifies first textual information;
- receive, from a second client device, a second translation request associated with the second video meeting, wherein the second translation request identifies second textual information;
- enqueue the first textual information in a first queue, the first queue having a first weight;
- enqueue the second textual information in a second queue, the second queue having a second weight;
- dequeue a first portion of the queued first textual information from the first queue;
- dequeue a second portion of the queued second textual information from the second queue; and
- insert the first and second portions into a translation buffer associated with a translation service, wherein the translation buffer is provided as input to the translation service.

16. The non-transitory computer-readable medium of claim 15, wherein the first portion of the queued first textual information dequeued corresponds to a fraction of the translation buffer in proportion to the first weight and the second portion of the queued second textual information dequeued corresponds to a fraction of the translation buffer in proportion to the second weight.

17. The non-transitory computer-readable medium of claim 15, the first translation request is received while the first video meeting is in progress; and the second translation request is received after the second video meeting has concluded and while the first video meeting is in progress.

18. The non-transitory computer-readable medium of claim 15, wherein the second queue comprises one or more subqueues, wherein each subqueue corresponds to a concluded video meeting, wherein enqueuing the second portion of the second textual information in the second queue comprises enqueuing the second portion of the second textual information in the subqueue corresponding to the second video meeting.

19. The non-transitory computer-readable medium of claim 15, wherein the first queue is an indexed queue comprising a hash map, the hash map comprising one or more keys and one or more values, wherein:
- the keys are indexes corresponding to the first textual information and the first video meeting; and
- the values include the first textual information, wherein enqueuing the first textual information in the first queue comprises enqueuing the indexes corresponding to the keys that correspond to the first textual information and the first video meeting.

20. The non-transitory computer-readable medium of claim 15, further comprising:
- determining that the first portion enqueued in the first queue comprises less first textual information than the fraction of the translation buffer in proportion to the first weight; and
- dequeuing a fifth portion of the second textual information from the second queue, wherein the fifth portion of the second textual information corresponds to a difference between the size of the translation buffer and the fraction of the translation buffer in proportion to the first weight.

* * * * *